(12) United States Patent
Walters et al.

(10) Patent No.: US 8,738,598 B2
(45) Date of Patent: May 27, 2014

(54) CHECKPOINTING ITERATORS DURING SEARCH

(75) Inventors: Chad Walters, San Francisco, CA (US); Lukas Biewald, San Francisco, CA (US); Nitay Joffe, Palo Alto, CA (US); Andrew Alan James, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/557,639

(22) Filed: Jul. 25, 2012

(65) Prior Publication Data

US 2012/0290554 A1    Nov. 15, 2012

Related U.S. Application Data

(63) Continuation of application No. 12/201,051, filed on Aug. 29, 2008.

(60) Provisional application No. 60/969,417, filed on Aug. 31, 2007, provisional application No. 60/969,486, filed on Aug. 31, 2007.

(51) Int. Cl.
*G06F 17/30* (2006.01)

(52) U.S. Cl.
CPC ............................. *G06F 17/30675* (2013.01)
USPC ...................................................... 707/706

(58) Field of Classification Search
CPC ................................................ G06F 17/30675
USPC ..................... 707/708, 715, 723, 706
See application file for complete search history.

(56) References Cited

U.S. PATENT DOCUMENTS

| 4,876,643 | A | 10/1989 | McNeil et al. |
|---|---|---|---|
| 5,267,156 | A | 11/1993 | Nomiyama |
| 5,386,556 | A | 1/1995 | Hedin et al. |
| 5,434,931 | A | 7/1995 | Quardt et al. |
| 5,519,608 | A | 5/1996 | Kupiec |
| 5,530,939 | A | 6/1996 | Mansfield, Jr. et al. |
| 5,696,962 | A | 12/1997 | Kupiec |
| 5,933,822 | A | 8/1999 | Braden-Harder et al. |

(Continued)

FOREIGN PATENT DOCUMENTS

| CN | 1606004 | 4/2005 |
|---|---|---|
| CN | 1658188 | 5/2005 |

(Continued)

OTHER PUBLICATIONS

U.S. Official Action dated Aug. 8, 2012 in U.S. Appl. No. 12/201,978.

(Continued)

*Primary Examiner* — Huawen Peng
(74) *Attorney, Agent, or Firm* — Dave Ream; Jim Ross; Micky Minhas

(57) ABSTRACT

Tools and techniques are described herein for checkpointing iterators during search. These tools may provide methods that include instantiating iterators in response to a search request. The iterators include fixed state information that remains constant over a life of the iterator, and further include dynamic state information that is updated over the life of the iterator. The iterators traverse through postings lists in connection with performing the search request. As the iterators traverse the posting lists, the iterators may update their dynamic state information. The iterators may then evaluate whether to create checkpoints, with the checkpoints including representations of the dynamic state information.

20 Claims, 8 Drawing Sheets

(56) References Cited

U.S. PATENT DOCUMENTS

| | | |
|---|---|---|
| 6,076,051 A | 6/2000 | Messerly |
| 6,161,084 A | 12/2000 | Messerly |
| 6,185,592 B1 | 2/2001 | Boguraev et al. |
| 6,189,002 B1 | 2/2001 | Roitblat |
| 6,243,670 B1 | 6/2001 | Bessho et al. |
| 6,246,977 B1 | 6/2001 | Messerly et al. |
| 6,269,368 B1 | 7/2001 | Diamond |
| 6,366,908 B1 | 4/2002 | Chong et al. |
| 6,374,209 B1 | 4/2002 | Yoshimi et al. |
| 6,654,740 B2 | 11/2003 | Tokuda et al. |
| 6,675,159 B1 | 1/2004 | Klein et al. |
| 6,678,677 B2 | 1/2004 | Roux et al. |
| 6,678,686 B1 | 1/2004 | Patel et al. |
| 6,741,981 B2 | 5/2004 | McGreevy |
| 6,766,316 B2 | 7/2004 | Caudill et al. |
| 6,766,320 B1 | 7/2004 | Wang et al. |
| 6,795,820 B2 | 9/2004 | Barnett |
| 6,823,301 B1 | 11/2004 | Ishikura |
| 6,842,730 B1 | 1/2005 | Ejerhed et al. |
| 6,871,199 B1 | 3/2005 | Binnig et al. |
| 6,901,399 B1 | 5/2005 | Corston |
| 6,947,923 B2 | 9/2005 | Cha et al. |
| 6,968,332 B1 | 11/2005 | Milic-Frayling |
| 7,016,828 B1 | 3/2006 | Coyne et al. |
| 7,027,974 B1 | 4/2006 | Busch et al. |
| 7,031,910 B2 | 4/2006 | Eisele |
| 7,035,789 B2 | 4/2006 | Abrego et al. |
| 7,120,574 B2 | 10/2006 | Troyanova et al. |
| 7,171,349 B1 | 1/2007 | Wakefield et al. |
| 7,184,950 B2 | 2/2007 | Weise |
| 7,194,406 B2 | 3/2007 | Ejerhed et al. |
| 7,225,121 B2 | 5/2007 | Maxwell et al. |
| 7,269,594 B2 | 9/2007 | Corston-Oliver |
| 7,319,951 B2 | 1/2008 | Rising et al. |
| 7,346,490 B2 | 3/2008 | Fass |
| 7,389,224 B1 | 6/2008 | Elworthy |
| 7,398,201 B2 | 7/2008 | Marchisio |
| 7,401,077 B2 | 7/2008 | Bobrow et al. |
| 7,403,938 B2 | 7/2008 | Harrison et al. |
| 7,593,845 B2 | 9/2009 | Ramsey |
| 2002/0091684 A1 | 7/2002 | Nomiyama et al. |
| 2002/0188586 A1 | 12/2002 | Veale |
| 2003/0233224 A1 | 12/2003 | Marchisio et al. |
| 2004/0103090 A1 | 5/2004 | Dogl et al. |
| 2004/0243554 A1 | 12/2004 | Broder et al. |
| 2004/0243556 A1 | 12/2004 | Ferrucci et al. |
| 2004/0249795 A1 | 12/2004 | Brockway |
| 2005/0043936 A1 | 2/2005 | Corston-Oliver et al. |
| 2005/0065777 A1 | 3/2005 | Dolan et al. |
| 2005/0071150 A1 | 3/2005 | Nasypny |
| 2005/0108001 A1 | 5/2005 | Aarskog |
| 2005/0108630 A1 | 5/2005 | Wasson et al. |
| 2005/0182617 A1 | 8/2005 | Reynar et al. |
| 2005/0182619 A1 | 8/2005 | Azara |
| 2005/0267871 A1 | 12/2005 | Marchisio et al. |
| 2005/0283474 A1 | 12/2005 | Francis et al. |
| 2006/0047632 A1 | 3/2006 | Zhang |
| 2006/0156222 A1 | 7/2006 | Chi |
| 2006/0161534 A1 | 7/2006 | Carson, Jr. et al. |
| 2006/0184517 A1 | 8/2006 | Anderson |
| 2006/0224582 A1 | 10/2006 | Hogue |
| 2006/0271353 A1 | 11/2006 | Berkan et al. |
| 2007/0073533 A1 | 3/2007 | Thione et al. |
| 2007/0073745 A1 | 3/2007 | Scott |
| 2007/0143098 A1 | 6/2007 | Van der Berg |
| 2007/0156393 A1 | 7/2007 | Todhunter et al. |
| 2008/0033982 A1 | 2/2008 | Parikh |
| 2008/0086498 A1 | 4/2008 | Sureka |
| 2008/0120279 A1 | 5/2008 | Xue |
| 2008/0172628 A1 | 7/2008 | Mehrotra |
| 2009/0019038 A1 | 1/2009 | Millett |
| 2009/0271179 A1 | 10/2009 | Marchisio et al. |
| 2010/0106706 A1 | 4/2010 | Rorex |

FOREIGN PATENT DOCUMENTS

| | | |
|---|---|---|
| EP | 0597630 | 5/1994 |
| KR | 10-0546743 | 4/2005 |
| WO | WO 02/067145 | 8/2002 |

OTHER PUBLICATIONS

U.S. Notice of Allowance dated Sep. 20, 2013 in U.S. Appl. No. 12/201,596.
International Search Report dated Mar. 31, 2009 in International Application No. PCT/US08/074938.
International Search Report dated Jan. 23, 2009 in International Application No. PCT/US08/074978.
International Search Report dated Mar. 31, 2009 in International Application No. PCT/US08/074984.
International Search Report dated Mar. 31, 2009 in International Application No. PCT/US08/074987.
International Search Report dated Mar. 26, 2009 in International Application No. PCT/US08/074935.
International Search Report dated Apr. 29, 2009 in International Application No. PCT/US08/074981.
European Search Report dated Oct. 5, 2011 in European Application No. 08799054.5.
U.S. Official Action dated Mar. 31, 2011 in U.S. Appl. No. 12/201,051.
U.S. Notice Allowance dated Apr. 25, 2012 in U.S. Appl. No. 12/201,051.
U.S. Official Action dated Jan. 3, 2011 in U.S. Appl. No. 12/201,596.
U.S. Official Action dated Jun. 22, 2011 in U.S. Appl. No. 12/201,596.
U.S. Official Action dated Mar. 17, 2011 in U.S. Appl. No. 12/201,504.
U.S. Official Action dated Oct. 12, 2011 in U.S. Appl. No. 12/201,504.
U.S. Notice of Allowance dated Apr. 5, 2012 in U.S. Appl. No. 12/201,504.
U.S. Official Action dated Jan. 25, 2011 in U.S. Appl. No. 12/201,675.
U.S. Official Action dated Apr. 14, 2011 in U.S. Appl. No. 12/201,675.
U.S. Official Action dated Oct. 3, 2011 in U.S. Appl. No. 12/201,675.
U.S. Official Action dated Mar. 15, 2011 in U.S. Appl. No. 12/201,721.
U.S. Official Action dated Oct. 26, 2011 in U.S. Appl. No. 12/201,721.
U.S. Notice of Allowance dated May 14, 2012 in U.S. Appl. No. 12/201,721.
U.S. Official Action dated Dec. 23, 2010 in U.S. Appl. No. 12/201,978.
U.S. Official Action dated Jun. 7, 2011 in U.S. Appl. No. 12/201,978.
U.S. Official Action dated Jan. 4, 2012 in U.S. Appl. No. 12/201,978.
Thione et al., "Applying Term Occurrence constraints in natural language search", U.S. Appl. No. 60/969,406, filed Aug. 31, 2007.
Walters et al., "Flexible Ranking infrastructure for query execution", U.S. Appl. No. 60/969,410, filed Aug. D 31, 2007.
Walters et al., "Checkpointing of composable lazily-evaluated integrators in search", U.S. Appl. No. 60/969,417, filed Aug. 31, 2007.
Thione et al., "Indexing of alias clusters for search", U.S. Appl. No. 60/969,426, filed Aug. 31, 2007.
Crouch et al., "Aboutness identification and indexing", U.S. Appl. No. 60/969,434, filed Aug. 31, 2007.
Polanyi et al., "Valence calculus for indexing with special reference to reported speech and thought", U.S. Appl. No. 60/969,442, filed Aug. 31, 2007.
Snow et al., "Bucketized threshold for runtime pruning of senses/ranking", U.S. Appl. No. 60/969,447, filed Aug. 31, 2007.
Pell et al., "Hierarchal probability-based weighting for hypernyms in word sense disambiguation", U.S. Appl. No. 60/969,451, filed Aug. 31, 2007.
Biewald et al., "Priority-based ranking functions for information retrieval", U.S. Appl. No. 60/969,453, filed Aug. 31, 2007.

(56) References Cited

OTHER PUBLICATIONS

Pell et al., "Priority-based disjunctive retrieval", U.S. Appl. No. 60/969,457, filed Aug. 31, 2007.
Rayner et al., "Semi-automatic example-based induction of semantic translation rules to support natural language search", U.S. Appl. No. 60/969,472, filed Aug. 31, 2007.
Thione et al., "Semantically-based highlighting of search results", U.S. Appl. No. 60/969,478, filed Aug. 31, 2007.
Salvetti et al., "Integration of coreference resolution in an ambiguity-sensitive natural language processing pipeline for a search platform", U.S. Appl. No. 60/969,483, filed Aug. 31, 2007.
Thione et al., "Fact-based indexing for natural language search", U.S. Appl. No. 60/969,486, filed Aug. 31, 2007.
Thione et al., "Attribute-value mapping to map structural information about entities to ontologies", U.S. Appl. No. 60/969,488, filed Aug. 31, 2007.
Thione et al., "Indexing and ranking role hierarchies search index", U.S. Appl. No. 60/969,490, filed Aug. 31, 2007.
Thione et al., "Efficient posting layout for retrieval of terms in dominance hierarchies", U.S. Appl. No. 60/969,495, filed Aug. 31, 2007.
Salvetti et al., "A system for browsing knowledge on the basis of semantic relations", U.S. Appl. No. 60/971,061, filed Sep. 10, 2007.
"Powerset, Natural Language Search Engine", retrieved at http://googlesystem.blogspot.com/2007102/powerset-natural-Ianguage-search-engine.html, Feb. 9, 2007. pp. 1-3.
Bontcheva et al., "Shallow Methods for Named Entity Coreference Resolution," *Proceedings of the TALN 2002 Workshop.* Nancy, France. Jun. 24-27, 2002, 9 pages.
Duchier,"Constraint Programming for Natural Language Processing", Aug. 2000, *Lecture Notes*, ESSLLI 2000, pp. 1-94.
Chien, "Fast and Quasi-Natural Language Search for Gigabytes of Chinese Texts", *Proceedings of the 18th Annual International ACM SIGIR Conference on Research and Development in Information Retrieval* (SIGIR '95), 1995. pp. 1-9.
Jun et al., "Keyfact-Based Information Retrieval System", TaeJon, Korea, downloaded Mar. 18, 2011 from http://www.dl.slis.tsukuba.ac.jp/ISDL97/proceedings/miseon/miseon.html, 6 pages.
Kolodner,"Indexing and Retrieval Strategies for Natural Language Fact Retrieval", Sep. 1983, *ACM Transactions on Database Systems* (TODS), vol. 8, No. 3, pp. 1-31.
Ng, Vincent "Shallow Semantics for Coreference Resolution," *Proceedings of the Twentieth International Joint Conference on Artificial Intelligence* (IJCAI), Hyderabad, India, Jan. 2007, pp. 1689-1694.
Tablan et al., "A Natural Language Query Interface to Structured Information", downloaded Mar. 18, 2011 from http://www.eswc2008.org/final-pdfs-for-web-site/onl-2.pdf, 15 pages.
Agichtein, et al., "Snowball: Extracting Relations from Large Plain-Text Collections," Dec. 1999, Columbia University Computer Science Dept. Technical Report CUCS-033-99, 13 pp.
Alesso, "Semantic Search Methods," downloaded Aug. 28, 2008 from hltp://microsoft.apress.com/asptodayarchiveI73985/semantic-search-methods, 14 pages.
Araghi, "Users Satisfaction through Belter Indexing," 2005, *Cataloging & Classification Quarterly*, 40(2): 5-12. 9 pp.

CS474 Intro to Natural Language Processing: Question Answering, downloaded Dec. 12, 2011 from http://www.cs.cornell.edu/courses/cs474/2005fa/Handouts/advanced-qa.pdf, 8 pgs.
Debrauwer et al., "Semantic Searching and Text Analysis with Distinguo®," downloaded Dec. 12, 2011 from http://www.ultralingua.com/ul/en/dox/Distinguo-White-Paper.pdf, 6 pp.
Hakia—Meaning-based Search Engine for a Better Search, downloaded Aug. 28, 2008 from http://www.techiequest.com/hakia-meaning-based-search-engine-for-a-bettr-search/, 8 pgs.
Han et al, "A Study on the Conceptual Modeling and Implementation of a Semantic Search System," Mar. 2008, *Korea Intelligent Information Systems Society*, 14(1): 67-84.
Huibers, "Towards an Axiomatic Aboutness Theory for Information Retrieval," 1998, Information Retrieval: Uncertainty and Logics—Advanced Models for the Representation and Retrieval of Information. Kluwer Academic Publishers, 7 pp.
Hussam et al., "Semantic Highlighting on the WWW: Educational Implications," Nov. 1998, *Proceedings of the WebNet 98 World Conference on the WWW, Internet and Intranet*, 6 pp.
Hutchins, "On the problem of 'Aboutness' in Document Analysis," Apr. 1977, *Journal of Informatics*, 1(1): 17-35. 16 pp.
Kang, et al., "Document Indexing: A Concept-Based Approach to Term Weight Estimation," 2005, *Information Processing and Management*, 41:1065-1080, 16 pp.
Kapoor et al., "STAR: A System for Tuple and Attribute Ranking of Query Answer" Apr. 15, 2007, *International Conference on Data Engineering* 2007, 2 pp.
Lo et al., "Using Semantic Relations with World Knowledge for Question Answering," 2006, *Proceedings of the 15th Text Retrieval Conference (TREC 15)*, 6 pp.
Manegold et al., A multi-query optimizer for Monet, Jan. 31, 2000, *Information Systems*, 18 pgs.
Moens et al., " Measuring Aboutness of an Entity in a Text," 2006, *Proceedings of the 1st Workshop on Graph Based Methods for Natural Language Processing*, 4 pp.
Seki, Y., "Answer Extraction System by Question Type from Query Biased Summary for Newspaper Articles," Sep. 2001-Oct. 2002, *Proceedings of the 3rd NTCIR Workshop*, 8 pp.
Sieg et al., "Learning Ontology-based User Profiles: A Semantic Approach to Personalized Web Search," Nov. 2007, *IEEE Intelligent Informatics Bulletin*, 8(1): 7-18. 12pp.
Smeaton et al., "Experiments on Using Semantic Distances between Words in Images Caption Retrieval," Aug. 1996, *Proceedings of the 19th Annual International ACM SIGIR Conference on Research and Development in Information Retrieval*, 8 pp.
Srihari et al., "Information Extraction Supported Question Answering," Oct. 15, 1999, downloaded from http://handle.dtic.mil/100.2/ADA460042, 12 pgs.
Taibi, et al., "A Semantic Search Engine for Learning Resources," 2005, *Recent Research Developments in Learning Technologies*, http://www.formatex.org/micte2005/349.pdf, 5pp.
Vintar et al., "Semantic Relations in Concept-Based Cross-Language Medical Information Retrieval," Sep. 22, 2003, *Proceedings of the ECML / PKDD Workshop on Adaptive Text Extraction and Mining*, 9 pp.

US 8,738,598 B2

CHECKPOINTING ITERATORS DURING SEARCH

CROSS-REFERENCE TO PRIORITY APPLICATIONS

This application is a continuation of U.S. application Ser. No. 12/201,051 entitled "Checkpointing Iterators During Search," filed Aug. 29, 2008, which claims the benefit of the filing date of: U.S. Provisional Application Ser. No. 60/969,417, filed on 31 Aug. 2007, entitled "Checkpointing of Composable Lazily-Evaluated Iterators in Search"; and U.S. Provisional Application Ser. No. 60/969,486, filed on 31 Aug. 2007 entitled "Fact-Based Indexing For Natural Language Search"; to the fullest extent permitted under 35 U.S.C. §119(e). This application also incorporates the contents of these Provisional Applications by this reference, as if those contents were included verbatim herein.

BACKGROUND

In response to search requests, search engines may create objects suitable for traversing forwards through posting lists. These posting lists may contain indexed information, against which the search requests are analyzed. Typically, these posting lists contain compressed information that lends itself only to forward traversals.

SUMMARY

Tools and techniques are described herein for checkpointing iterators during search. These tools may provide methods that include instantiating iterators in response to a search request. The iterators include fixed state information that remains constant over a life of the iterator, and further include dynamic state information that is updated over the life of the iterator. The iterators traverse through postings lists in connection with performing the search request. As the iterators traverse the posting lists, the iterators may update their dynamic state information. The iterators may then evaluate whether to create checkpoints, with the checkpoints including representations of the dynamic state information.

The above-described subject matter may also be implemented as a method, computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
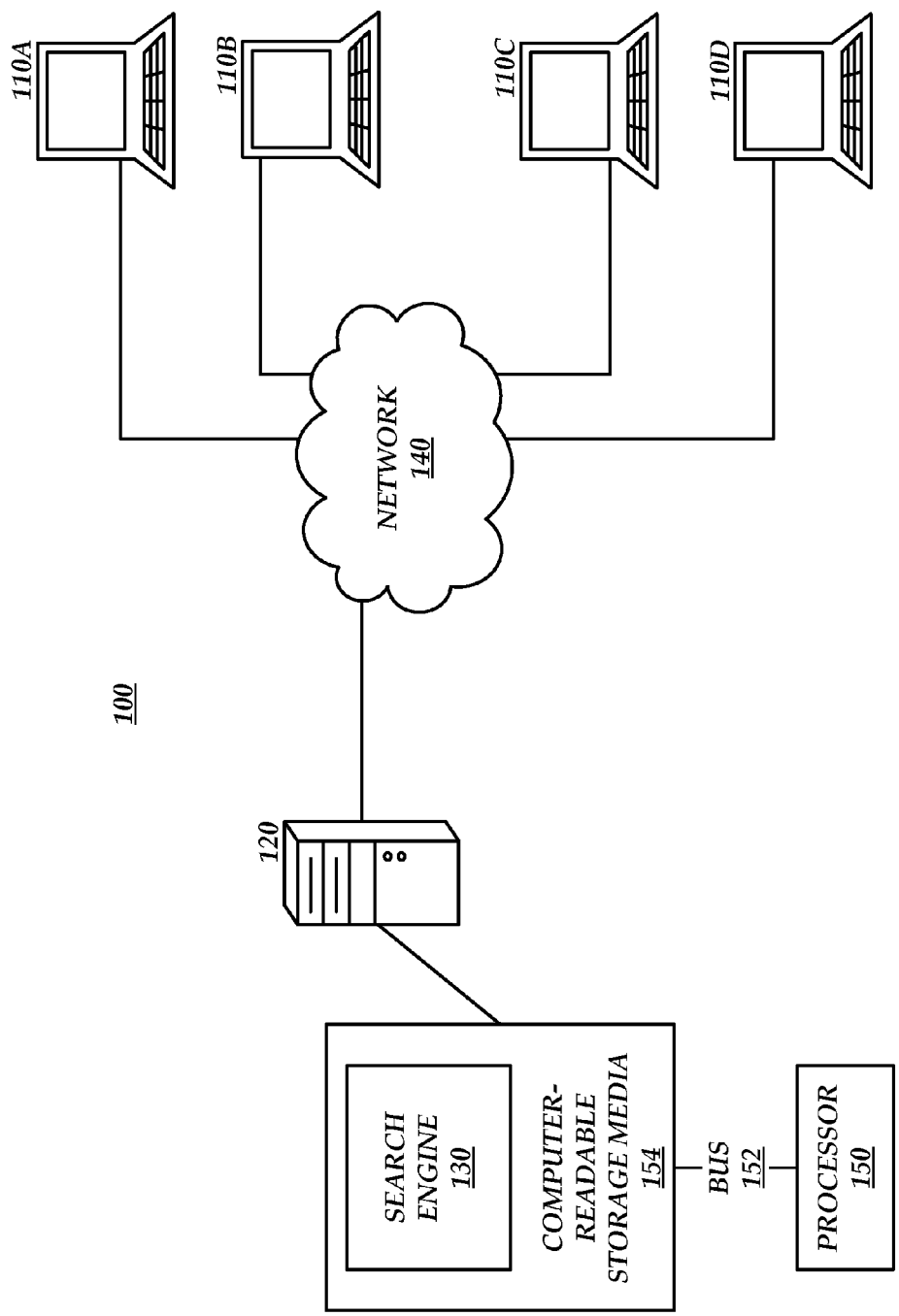
FIG. 1 is a block diagram illustrating overall systems or operating environments for checkpointing iterators during search.

The following detailed description is directed to technologies for checkpointing iterators during search. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of tools and techniques for checkpointing iterators during search will be described.

FIG. 1 is a block diagram illustrating overall systems or operating environments for checkpointing iterators during search. Turning now to FIG. 1 in more detail, details will be provided regarding an illustrative operating environment for the implementations presented herein. In particular, a network architecture diagram 100 illustrates an information search system according to aspects of an embodiment presented herein. Client computers 110A-110D can interface through a network 140 to a server 120 to obtain information associated with a search engine 130. While four client computers 110A-110D are illustrated, it should be appreciated that any number of client computers 110A-110D may be in use. The client computers 110A-110D may be geographically distributed across a network 140, collocated, or any combination thereof. While a single server 120 is illustrated, it should be appreciated that the functionality of the server 120 may be distributed over any number of multiple servers 120. Such multiple servers 120 may be collocated, geographically distributed across a network 140, or any combination thereof.

According to one or more embodiments, the search engine 130 may support search engine functionality. In a search engine scenario, a user query may be issued from a client computer 110A-110D through the network 140 and on to the server 120. The user query may be in a natural language format, or in other suitable format. At the server, the search engine 130 may process the query to support a search based upon keywords, syntax, and semantics extracted from the query. Results of such a search may be provided from the server 120 through the network 140 back to the client computers 110A-110D.

One or more search indexes may be stored at, or in association with, the server 120. Information in a search index may be populated from a set of source information, or a corpus. For example, in a web search implementation, content may be collected and indexed from various web sites on various web servers (not illustrated) across the network 140. Such collection and indexing may be performed by software executing on the server 120, or on another computer (not illustrated). The collection may be performed by web crawlers or spider applications. The search engine 130 may be applied to the collected information, such that content collected from the corpus may be indexed based on syntax and semantics extracted by the search engine 130. Indexing and searching is discussed in further detail with respect to FIG. 2.

The client computers 110A-110D may act as terminal clients, hypertext browser clients, graphical display clients, or other networked clients to the server 120. For example, a web browser application at the client computers 110A-110D may support interfacing with a web server application at the server 120. Such a browser may use controls, plug-ins, or applets to support interfacing to the server 120. The client computers 110A-110D can also use other customized programs, applications, or modules to interface with the server 120. The client computers 110A-110D can be desktop computers, laptops, handhelds, mobile terminals, mobile telephones, television set-top boxes, kiosks, servers, terminals, thin-clients, or any other computerized devices.

The network 140 may be any communications network capable of supporting communications between the client computers 110A-110D and the server 120. The network 140 may be wired, wireless, optical, radio, packet switched, circuit switched, or any combination thereof. The network 140 may use any topology and links of the network may support any networking technology, protocol, or bandwidth such as Ethernet, DSL, cable modem, ATM, SONET, MPLS, PSTN, POTS modem, PONS, HFC, satellite, ISDN, WiFi, WiMax, mobile cellular, any combination thereof, or any other data interconnection or networking mechanism. The network 140 may be an intranet, an internet, the Internet, the World Wide Web, a LAN, a WAN, a MAN, or any other network for interconnection computers systems.

It should be appreciated that, in addition to the illustrated network environment, the search engine 130 can be operated locally. For example, a server 120 and a client computer 110A-110D may be combined onto a single computing device. Such a combined system can support search indexes stored locally or remotely.

Turning to the server 120 in more detail, these servers may include one or more processors 150, which may have a particular type or architecture, chosen as appropriate for particular implementations. The processors 150 may couple to one or more bus systems 152 chosen for compatibility with the processors 150.

The server 120 may also include one or more instances of computer-readable storage media 154, which couple to the bus systems 152. The bus systems may enable the processors 150 to read code and/or data to and/or from the computer-readable storage media 152. The media 152 may represent storage elements implemented using any suitable technology, including but not limited to semiconductors, magnetic materials, optics, or the like. The media 152 may include memory components, whether classified as RAM, ROM, flash, or other types, and may also represent hard disk drives.

The storage media 152 may include one or more modules of software instructions that, when loaded into the processor 150 and executed, cause the server systems 120 to perform various tools and techniques relating to checkpointing iterators during search. Examples of these modules may include the search engine 130, along with other software components as well.

Figure 2:
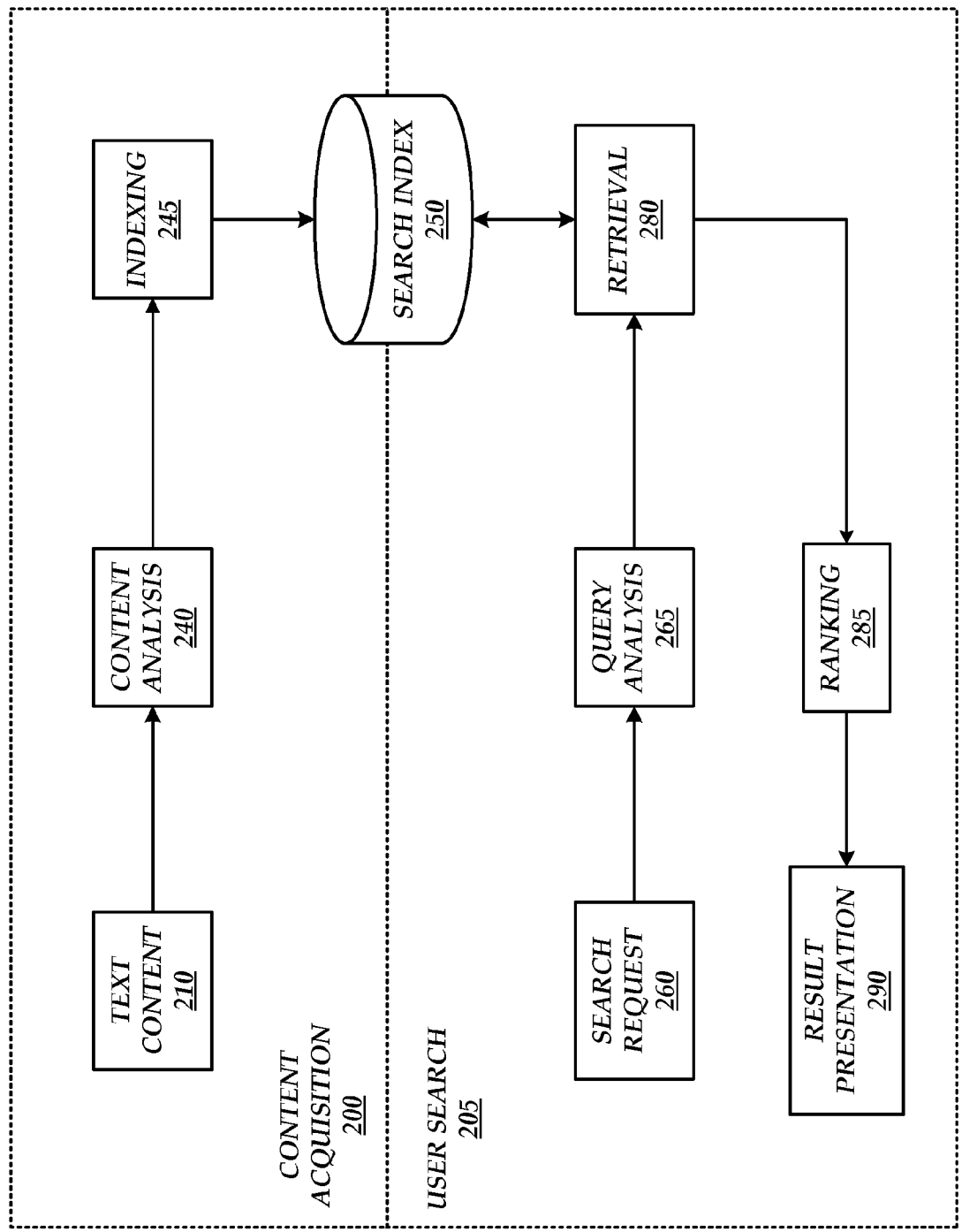
FIG. 2 is a block diagram illustrating processes or functions that a search engine may perform to checkpointing iterators during search.

FIG. 2 illustrates processes or functions that a search engine (e.g., 130 in FIG. 1) may perform to provide checkpointing iterators during search. Referring now to FIG. 2 in more detail, a functional block diagram illustrates various components of a search engine 130 according to one exemplary embodiment. As discussed above, the search engine 130 can support information searches. In order to support such searches, a content acquisition process 200 is performed. Operations related to content acquisition 200 extract information from documents provided as text content 210. This information can be stored in a search index 250 suitable for searching. Operations related to a user search 205 can support processing of a user entered search query. The user query can take the form of a search request 260. The search engine 130 can analyze the user input to translate a query into a representation to be compared with information represented within the search index 250. The content and structuring of information in the search index 250 can support rapid matching and retrieval of documents, or portions of documents, that are relevant to the meaning of the query or search request 260.

The text content 210 may comprise documents in a very general sense. Examples of such documents can include web pages, textual documents, scanned documents, databases, information listings, other Internet content, or any other information source. This text content 210 can provide a corpus of information to be searched. Processing the text content 210 can occur in one or more stages, denoted generally as content analysis 240. For example, the text content 210 may be separated at page, paragraph, sentence, word, or other suitable boundaries. The separated portions of the text content 210 may can be analyzed to enable this text content to be queried and searched later. A suitable example of this content analysis may include performing the inverting process represented generally at 308 in FIG. 3.

In turn, the outputs from the content analysis 240 can be provided to an indexing process 245. An index can support representing a large corpus of information so that the locations of words and phrases can be rapidly identified within the index. The search engine 130 may use keywords as search terms, such that the index keywords specified by a user maps to articles or documents where those keywords appear. The search index 250 may thus organize the text content for subsequent keyword or other search. In some cases, semantic relationships can be assigned to words during both content acquisition 200 and user search 205.

In different possible implementation scenarios, queries against the search index 250 can be based on input keywords. However, in other scenarios, queries run against the search index 250 may specify words in specific semantic roles. In these latter scenarios, the roles played by the word in the sentence or phrase may be stored in the search index 250. The search index 250 can be considered an inverted index that is a rapidly searchable database whose entries are keywords, with pointers to the documents or web pages on which those words occur. The search index 250 can support hybrid indexing. Such hybrid indexing can combine features and functions of both keyword indexing and semantic indexing.

User entry of queries can be supported in the form of search requests 260. The query can be analyzed through a processing pipeline similar, or identical, to that used in content acquisition 200. That is, the search requests 260 can be processed by query analysis 265 to extract keywords or other items specified in the search request 260. Following query analysis 265, the search request 260 can be passed to a retrieval process 280, which runs the search request against the search index 250. In some implementations, the retrieval process 280 can support hybrid index queries, where both keyword index retrieval and semantic index retrieval (in connection with queries expressed in natural language) may be provided alone, or in combination.

In response to a user query, results of retrieval 280 from the search index 250 may be passed to a ranking process 285. Ranking can leverage both keyword and semantic information. During ranking 285, the results obtained by retrieval 280 can be ordered by various metrics in an attempt to place the most desirable results closer to the top of the retrieved information to be provided to the user as a result of presentation 290.

Figure 3:
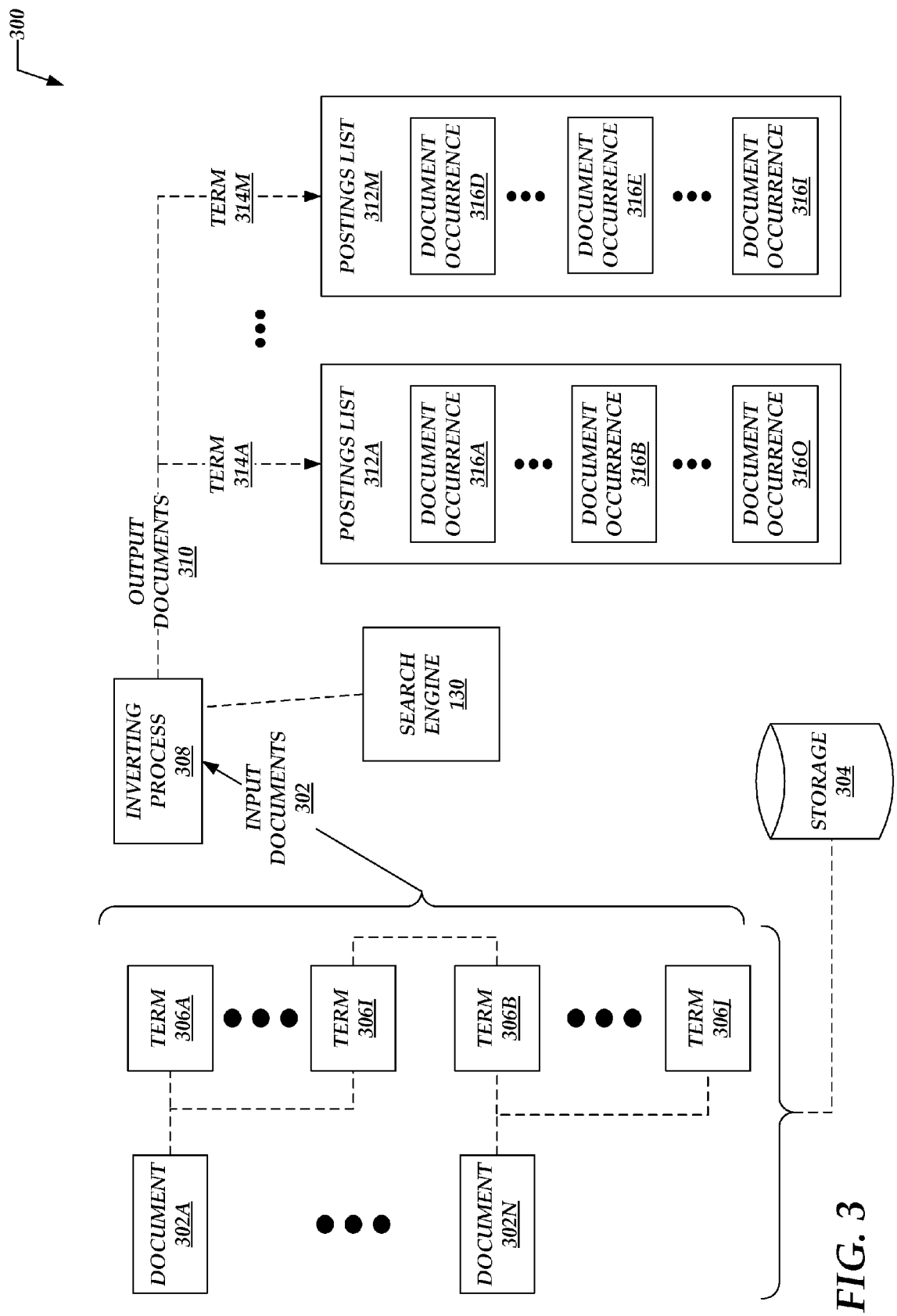
FIG. 3 is a combined block and flow diagram illustrating data structures and related hierarchies with which the search engine may interact when inverting input documents from a document-major or scenario to a term or token-major scenario.

FIG. 3 illustrates data structures and related hierarchies, denoted generally at 300, with which the search engine 130 may interact in inverting input documents from a document-major or scenario to a term or token-major scenario. For example, the search engine 130 may process text contained in one or more input documents 302*a* and 302*n* (collectively, documents 302). Storage elements 304 may contain any number of the documents 302, with the two documents 302*a* and 302*n* being provided only for example.

The input documents 302 may contain any number of particular terms, with FIG. 3 illustrating a scenario in which the document 302*a* contains any number of illustrative terms 306*a* and 306*i* (collectively, terms 306), and the document 302*n* contains any number of illustrative terms 306*b* and 306*j* (also collectively, terms 306). In general, these input terms 306 represents terms for which users may subsequently search within the input documents 302. Although FIG. 3 illustrates two example terms 306 contained within the input documents 302*a* and 302*n*, it is noted that FIG. 3 provides this scenario only for example, and that these input documents 302 may contain any number of terms 306.

In turn, these terms 306 may have any number of relationships to one another. For example, some terms (e.g., 306*a* and 306*j*) may appear only in single ones of the documents 302. Other terms (e.g., 306*i* and 306*b*) may appear in two or more of the input documents 302, as represented by the dashed line connecting blocks 306*i* and 306*b* in FIG. 3.

The search engine 130 may provide an inverting process 308, which receives the input documents 302 and generates output documents 310 therefrom. More specifically, the inverting process 308 may transform the input documents 302 from a document-major scenario (in which a given document is linked to a contained set of terms) to a term-major scenario (in which a given term linked to a set of documents in which the term appears).

As shown in FIG. 3, the inverting process 308 may identify a set of input terms 306 appearing in the input documents 302, and may generate entries in a postings list 312. FIG. 3 provides examples of two postings lists, denoted at 312*a* and 312*m* (collectively, postings lists 312). In some implementations, the input terms 306 may be represented by tokens or other term representations, denoted at 314*a* and 314*m* (collectively, term representations 314). The term representations 314 may be associated with respective postings lists 312, such that a given term (e.g., 314*a*) has a corresponding postings list (e.g., 312*a*).

Turning to the postings list 312*a* in more detail, an entry 316*a* may indicate a first location where the term 314*a* appears in a given input document (e.g., 302*a*). A second entry 316*b* may indicate a second location where the term 314*a* appears in an input document (e.g., 302*a*, 302*n*, or the like). Another entry 316*o* may indicate where the term 314*a* appears in the input document (e.g., 302*a*, 302*n*, or the like). In general, the number of entries 316*a*-316*o* (collectively, entries or document occurrences 316) in a given instance of the postings list 312 may vary, depending on how many different times a given term 314*a* appears or occurs in a set of input documents 302 at a given time.

Turning to the postings list 312*m* in more detail, this postings list may contain any number of entries 316*d*, 316*e*, and 316*i* (also collectively, entries or document occurrences 316) that indicate where the given term 314*m* appears in one or more of the documents 302. In general, the description of the postings list 312*a* and related entries 316*a*-316*o* apply equally to the postings list 312*m* and entries 316*d*-316*i*, as related to the term 314*m*. In addition, the number of entries or document occurrences 316 in the postings lists 312 may vary over time, as the inverting process 308 analyzes more documents 302. The inverting process 308 may create respective postings lists 312 for the various terms 306 located in the input documents 302, representing these input terms 306 at 314 in the postings lists 312.

In some implementations, the postings lists 312 may be stored in a compressed format. For example, the postings lists 312 may be compressed using delta encoding techniques, or other suitable encoding or compression approaches. As discussed in more detail below with FIG. 5, some of these encoding or compression approaches may involve traversing the postings lists in only one direction, typically in a forward direction only. However, the tools and techniques described herein for creating and reverting to checkpoints associated with the iterators may enable the iterators to traverse backwards through the postings lists.

Having described the inverting process 308 for creating the terms postings list 312 and the documents postings list 316 in FIG. 3, the discussion now turns to a description of iterators for traversing these postings lists. This description is now provided with FIG. 4.

Figure 4:
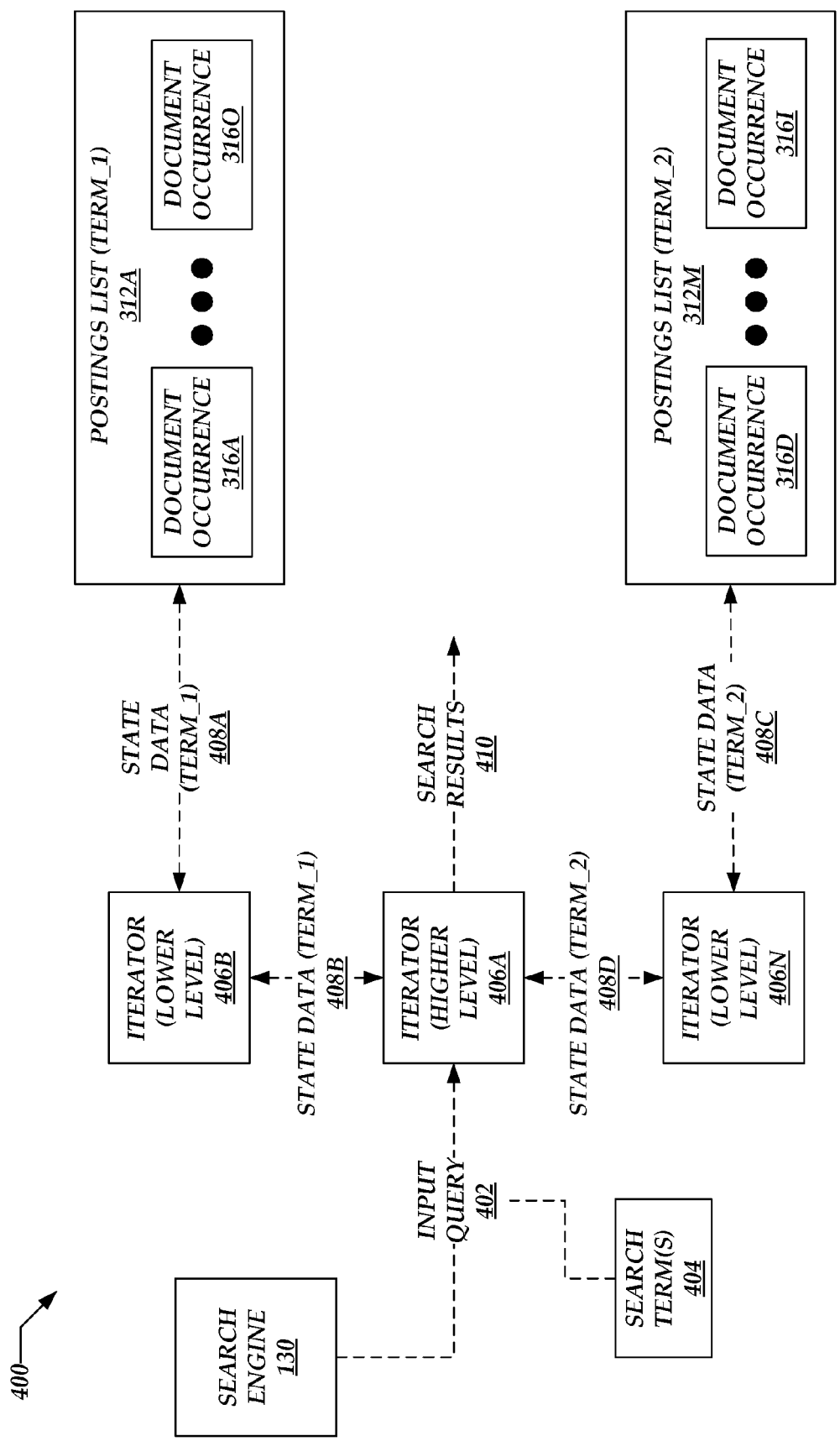
FIG. 4 is a combined block and flow diagram illustrating components and process flows related to iterators suitable for traversing postings lists.

FIG. 4 illustrates components and process flows, denoted generally at 400, related to iterators suitable for traversing postings lists, such as the postings lists 312*a* and 312*m* described above in FIG. 3. For ease of reference, but not to limit possible implementations, FIG. 4 may carry forward some items described previously, and may refer to them using identical reference numbers.

Turning to FIG. 4 in more detail, a search engine (e.g., 130) may receive input searches or queries 402 from users. These input queries 402 may reference or contain one or more search terms 404. In response to these queries 402, the search engine 130 may instantiate one or more iterators. FIG. 4 provides an example in which three iterators 406*a*, 406*b*, and 406*n* (collectively, iterators 406) may be arranged in a hierarchy. Within this example hierarchy, the iterator 406*a* may function as a higher-level iterator, controlling operations of the iterators 406*b* and 406*n*, which function as lower-level iterators operating on behalf of the iterator 406*a*.

The iterators 406 may be lazily evaluated, in the sense that they are evaluated only upon request. Put differently, the iterators 406 are not necessarily evaluated automatically and constantly over time. Thus, any data associated with the iterators is not materialized (e.g., decompressed or decoded) until explicitly requested.

In the example shown, the higher-level iterator 406a may instantiate the lower-level iterator 406b to traverse the terms postings list 312a, and may instantiate the lower-level iterator 406n to traverse the documents postings list 312m. For example, if the input query 402 includes two or more search terms 404, the lower-level iterator 406b may be assigned a first one of the search terms, and other lower-level iterator 406n may be assigned another of the search terms. In FIG. 4, the postings list 312a is assumed to correspond to the first search term, and the postings list 312m is assumed to correspond to the other search term. Accordingly, the higher-level iterator 406a may direct the lower-level iterator 406b to the postings list 312a, and may direct the lower-level iterator 406n to the postings list 312m.

As the lower-level iterator 406b traverses the postings list 312a, state data 408a represents the entry 316a-316o currently pointed-to by the lower-level iterator 406b. More specifically, the state data 408a may indicate the document occurrence to which the lower-level iterator 406b is pointing at a given time. The lower-level iterator 406b may share this state data with the higher-level iterator 406a, as represented at 408b. Likewise, as the lower-level iterator 406n traverses the postings list 312m, state data 408c represents the entry 316d-316i currently pointed-to by the lower-level iterator 406n. More specifically, the state data 408c may indicate the document occurrence to which the lower-level iterator 406n is pointing at a given time. The lower-level iterator 406n may share this state data with the higher-level 406a, as represented at 408d.

At any given point in the lower-level iterators' traversal through the postings lists, the state data 408a-408d (collectively, state data 408) enables the higher-level iterator 406a to identify the document occurrence 316 to which the lower-level iterators are pointing. For example, assuming that the input query 402 is requesting those documents that contain both of two or more search terms 404 (e.g., "foo" and "bar"), the higher-level iterator 406a may continually examine the state data 408 to determine when the lower-level iterators 406b and 406n are both pointing to term occurrences within the same given document. When this condition occurs, the higher-level iterator 406a may include representations of this given document in search results 410.

In providing the examples shown in FIG. 4, it is noted that these examples may be extended beyond the illustrative scenarios shown in FIG. 4. For example, FIG. 4 discusses an example in which two lower-level iterators 406b and 406n traverse postings lists 312 to search for occurrences of two terms appearing within documents, with the higher-level iterator 406a intersecting these document occurrences to produce search results 410. However, the input queries 402 may assume any level of complexity, with any number of higher-level iterators 406a and lower-level iterators 406b and 406n being instantiated to perform any type of different functions in connection with such input queries 402.

In the examples above, the iterator 406a may take the intersection of these two sets, to identify all documents that contain both the terms "foo" and "bar". However, higher-level iterators (e.g., 406a) may perform other types of operations as well, whether characterized as logical OR (i.e., union) operations, logical AND (i.e., intersection) operations, or the like. In addition, these combinatorial operations may be performed at the document level, or at the position level within documents. The iterators 406 may also operate at different levels within the documents (e.g., fact, sentence, section, and the like), in addition to the document and token level.

The hierarchies between the higher-level iterators 406a and lower level iterators 406b and 406n may contain multiple levels, as suitable in different implementations scenarios. Thus, the two-level scenario shown in FIG. 4 is understood as illustrative only, provided with the understanding that this scenario may be extended to arbitrary levels or depth without departing from the scope and spirit of this description.

Having described the hierarchy is an interaction between higher-level and lower-level iterators 406 in FIG. 4, the discussion now turns to a more detailed description of iterators and related storage structures. This description is now presented with FIG. 5.

Figure 5:
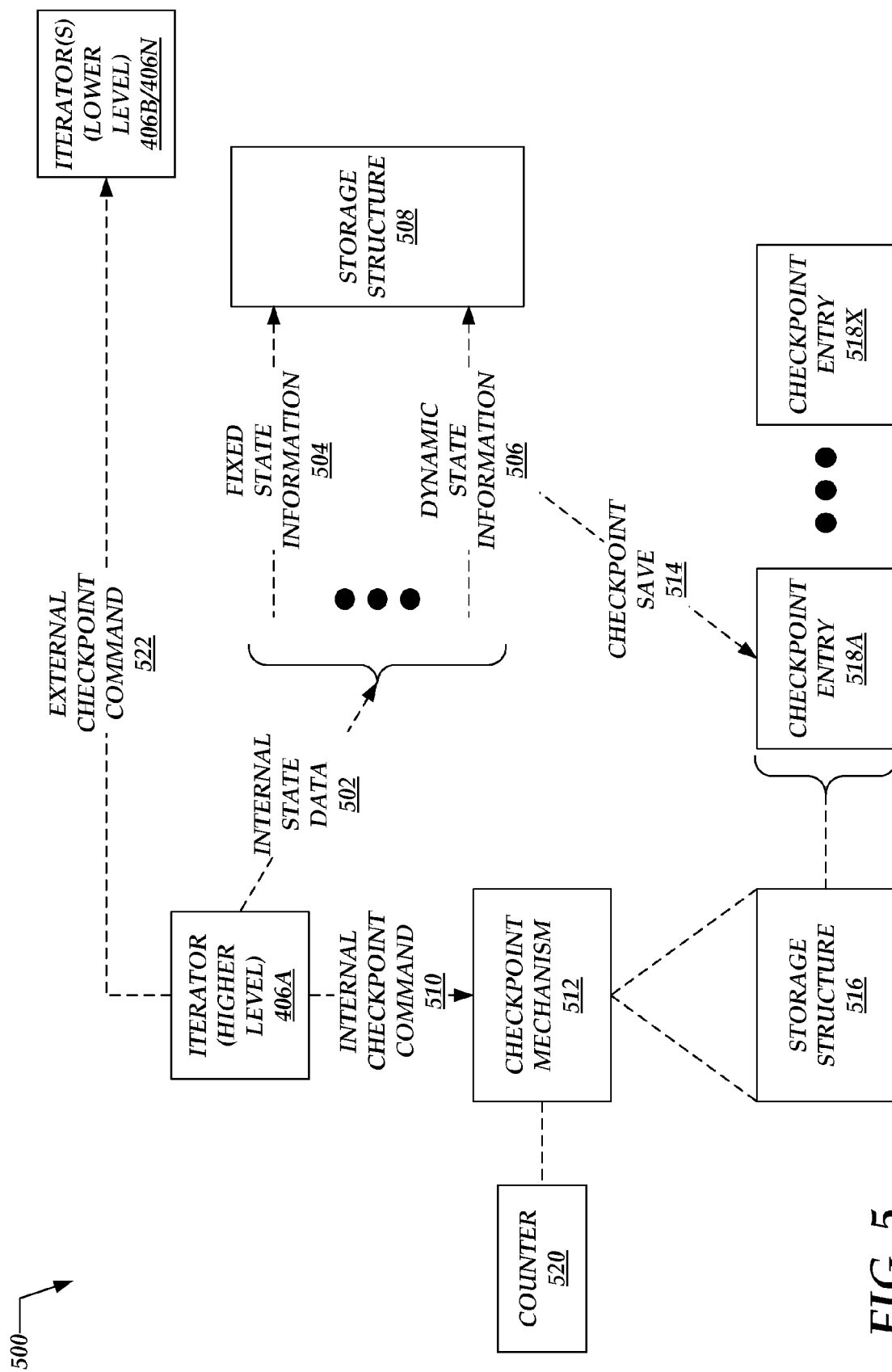
FIG. 5 is a combined block and flow diagram illustrating components and data flows that provide more detailed descriptions of the iterators shown in FIG. 4.

FIG. 5 illustrates components and data flows, denoted generally at 500, that provide more detailed descriptions of the iterators shown in FIG. 4. For ease of description, but not to limit possible implementations, FIG. 5 carries forward an example higher-level iterator 406a and an example lower-level iterator 406b or 406n. However, it is noted that this description may be applied scenarios including any number of iterators 406.

In previous techniques, iterators may be configured to support traversals in only one direction. For example, the entries and in postings lists and may be encoded in such a way that bidirectional traversal is computationally expensive. In some cases, these entries and may be delta-encoded or otherwise compressed in a variable length format. The location of an entry N may not be stored absolutely, but may be instead computed relative to the location of a previous entry N−1, when traversing forward through the postings list.

For a variety of reasons, it may be useful to backtrack the iterators through a postings list. For example, it may be useful to reuse iterators and postings lists and multiple query clauses, for example to implement different querying strategies. In other scenarios, a given query may be ambiguous. In such cases, the query may be executed multiple different ways, to account for this ambiguity. To optimize execution in such scenarios, it may be useful to backtrack the iterators to some extent. In other examples, when implementing discriminative rankings or feature extractions that refer to multiple lists, it may be useful to refer to the same streams of search results multiple times.

While it may be straightforward to traverse forwards from the entry N−1 to the entry N (i.e., by applying the appropriate delta), the process may not be reversible. Put differently, using previous techniques, it may not be computationally feasible or efficient to backtrack from the entry N to the entry N−1. However, the iterators described herein may provide a checkpointing mechanism that facilitates backtracking, as well as providing other capabilities.

Turning now to FIG. 5 in more detail, a given iterator (e.g., 406a), may maintain internal state information, denoted generally at 502. More specifically, this internal state information 502 may include fixed or static state information 504, which remains constant or unchanged during the lifetime of the iterator. Examples of the fixed state information 504 may include, but are not limited to, pointers to the beginning or end of a postings list. Other examples of fixed state information may include pointers to lower-level iterators controlled by the iterator.

The internal state information 502 may also include dynamic state information 506, which represents changing information that is updated over the lifetime of the iterator. For example, as a given iterator traverses a given postings list, or manages the operations of another child iterator, the dynamic state information 506 may take on different values, while the fixed state information 504 remains unchanged or constant. Other examples of the dynamic state information may include representations of the document to which any given iterator is pointing at a given time.

The iterator 406a may maintain a storage structure 508, which stores the fixed state information 504 and the dynamic state information 506. As some convenient point in the execution of the iterator 406a, the iterator may generate or receive a checkpoint command 510. The checkpoint command 510 may be internal, in the sense that the given iterator 406a generates or receives the checkpoint command for its own internal use, rather than generating this checkpoint command to direct another iterator to create a checkpoint.

The iterator 406a may include a checkpoint mechanism 512, which is responsive to the checkpoint command 510 to capture the current contents of the dynamic state information 506 as a checkpoint. FIG. 5 illustrates saving an example checkpoint at 514. Because the fixed state information 504 does not change over the lifetime of the iterator, the checkpoint 514 saves only the dynamic state information 506.

As described in further detail below, the iterator 406a may continue executing for any time interval after creating a given checkpoint 514. However, the iterator 406a may backtrack to the given checkpoint 514 by reloading the dynamic state information 506 back into the storage structure 508. Put differently, the iterator 406a may restore the previous dynamic state information 506 from the checkpoint 514.

Turning to the checkpoint mechanism 512 in more detail, this mechanism may include a supplemental storage structure 516. In turn, the storage structure may include any number of checkpoint storage entries 518a and 518x (collectively, checkpoint storage entries 518). In some implementation scenarios, the storage structure 516 may include a single checkpoint entry (e.g., only 518a), for storing a single instance of the dynamic state information 506 during a single checkpoint save 514. In this manner, the checkpoint mechanism 512 may enable the iterator 406a to backtrack or restore to the single checkpoint 514.

In other implementation scenarios, the storage structure 516 may include a plurality of checkpoint entries 518. These checkpoint entries may enable the checkpoint mechanism 512 to save and maintain a plurality of checkpoints 514 for the iterator 406a. In these latter scenarios, the checkpoint entries 518 may be configured as any suitable or appropriate data structure. For example, the storage structure 516 and related entries 518 may be implemented as a stack or LIFO structure.

The storage associated with the checkpoint entries 518 may be pre-allocated, for example, in cases where the items being pushed into the stack have a fixed, known size. Pre-allocating the storage for the checkpoint entries 518 may avoid the expense of dynamically allocating and deallocating storage while the iterator is executing. When this pre-allocated storage space is filled, the checkpoint mechanism 512 may allocate additional storage space, or return an error.

Assuming a stack implementation, newer checkpoints 514 may be pushed into the top of the structure, pushing previous checkpoints further into the stack. To backtrack the iterator 406a to a previous state, the iterator 406a may pop the top entry from the stack structure, and copy the dynamic state information from that top entry into the appropriate location within storage structure 508, thereby restoring a previous state of the iterator 406a.

In these latter implementations, in which the storage structure 516 maintains a plurality of checkpoint storage entries 518, the checkpoint mechanism 512 may maintain a counter mechanism 520. This counter mechanism 520 may indicate how deep the stack is at a given time. Put differently, the counter mechanism 520 indicates where the "top" of the stack is at a given time. The next time that a checkpoint is saved, the dynamic state information 506 is pushed into the top of the stack. The next time that a checkpoint is restored, the dynamic state information 506 is popped from the top of the stack. The checkpoint mechanism 512 may update the counter 520 as appropriate, when checkpoints 514 are saved or restored during the lifetime of the iterator 406a.

In some cases, the iterator 406a may be a higher-level iterator, operating within a hierarchy that includes one or more lower-level or child iterators (e.g., 406b or 406n). In such scenarios, if the iterator 406a either determines for itself to save a checkpoint 514, or is commanded by a parent iterator to save the checkpoint 514, the iterator 406a may generate an external checkpoint command 522. In turn, the iterator 406a may direct the external checkpoint command to any lower-level or child iterators. As now described further with FIG. 6, these lower-level iterators may receive these external checkpoint commands 522, and in response thereto save their own dynamic state information as checkpoints.

Figure 6:
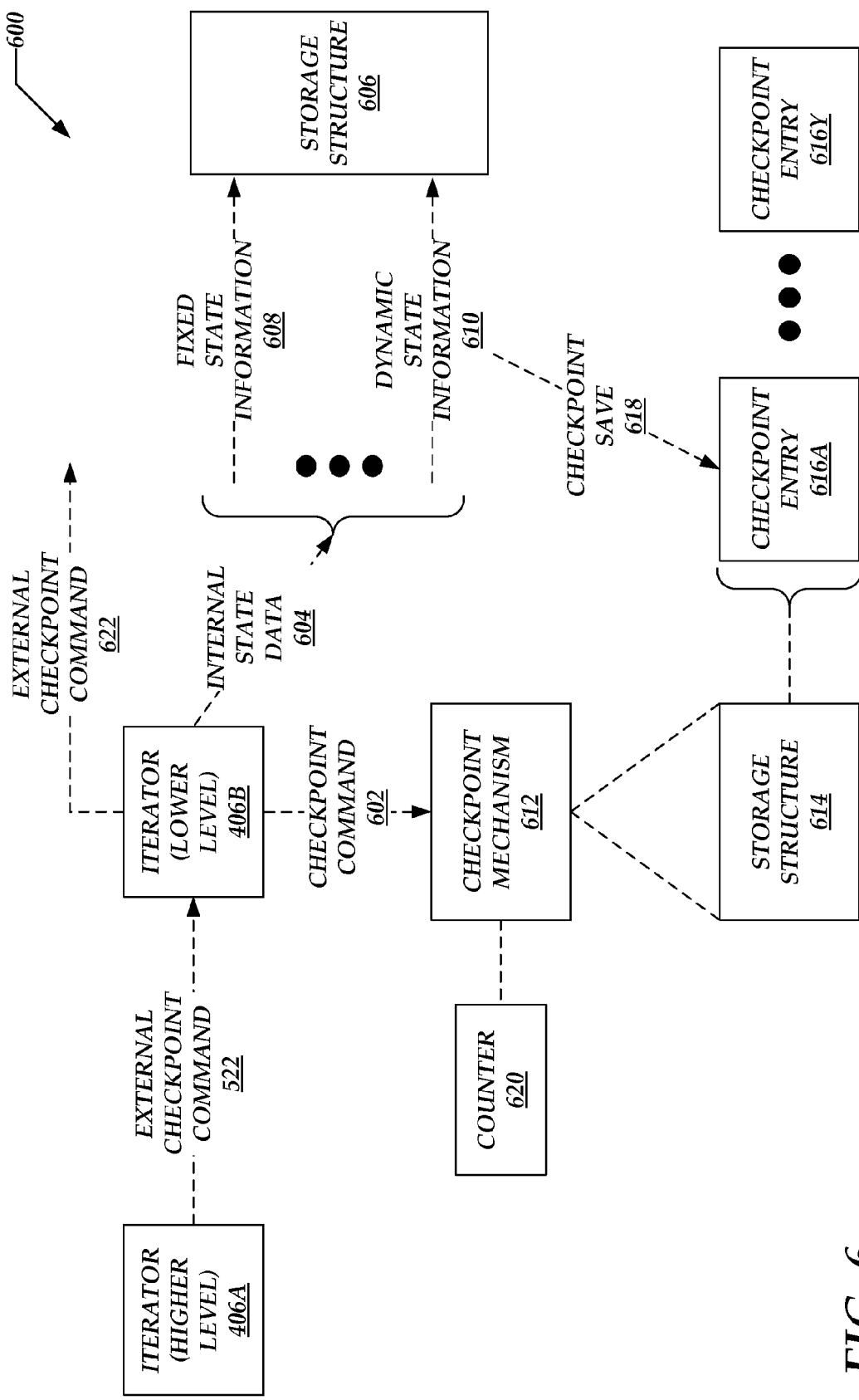
FIG. 6 is a combined block and flow diagram illustrating components and data flows that show in further detail how a child or lower-level iterator may receive and respond to a checkpoint command received from a parent or higher-level iterator.

FIG. 6 illustrates components and data flows, denoted generally at 600, that described in further detail how a child or lower-level iterator may receive and respond to a checkpoint command received from a parent or higher-level iterator. For ease of description and reference, FIG. 6 provides an example higher-level iterator at 406a, and provides an example lower-level iterator at 406b.

Turning to FIG. 6 in more detail, the higher-level iterator 406a may generate an external checkpoint command 522, as received by the lower-level iterator 406b. In response to the external checkpoint command 522, the lower-level iterator 406b may generate an internal checkpoint command 602, which is similar to the internal checkpoint command 510 shown in FIG. 5. The iterator 406b may maintain an internal state data 604 (similar to the internal state data 502 in FIG. 5), and may maintain storage structure 606 (similar to the storage structure 508 in FIG. 5).

The storage structure 606 may contain fixed state information 608, with the description of the fixed state information 504 in FIG. 5 applying generally to the fixed state information 608. The storage structure 606 may also contain dynamic state information 610, with the description of the dynamic state information 506 in FIG. 5 applying generally to the fixed state information 610.

The iterator 406b may include a checkpoint mechanism 612, similar to the checkpoint mechanism 512 shown in FIG. 5. This checkpoint mechanism 612 may maintain a storage structure 614, with the description of the storage structure 516 applying generally to the storage structure 614. The storage structure 614 may include one or more checkpoint storage entries 616a-616y (collectively, checkpoint storage entries 616). In general, the above discussion of the checkpoint entries 518 applies equally to the checkpoint entries 616, and in the interests of conciseness, is not repeated here.

In response to the internal checkpoint command 602, the checkpoint mechanism 612 may capture a checkpoint 618, thereby storing an instance of the current dynamic state information 610 in one of the checkpoint entries (e.g., 616a). The checkpoint mechanism 612 may also maintain a counter mechanism 620, which may operate similarly to the counter mechanism 520 described above with FIG. 5.

In some cases, the iterator 406b may operate within a hierarchy in which the iterator 406b has a parent iterator (e.g., 406a), and/or one or more lower-level or child iterators (not shown in FIG. 6). In scenarios in which the iterator 406b as one or more child iterators, the iterator 406*b* may generate an external checkpoint command 622, and direct this command to such child iterators.

Figure 7:
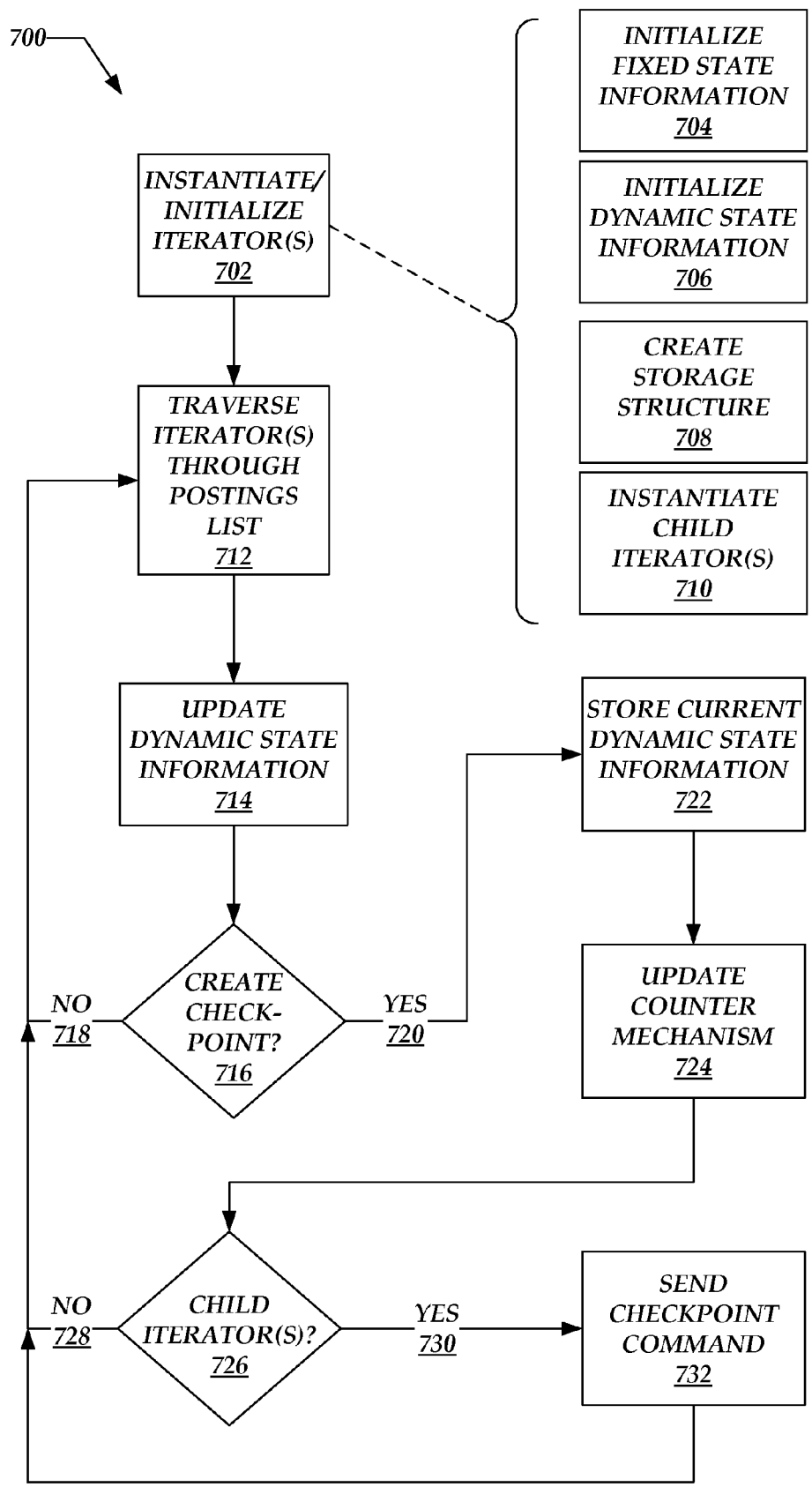
FIG. 7 is a flow diagram illustrating processes for operating iterators, more particularly, illustrating processes for creating checkpoints.
Figure 8:
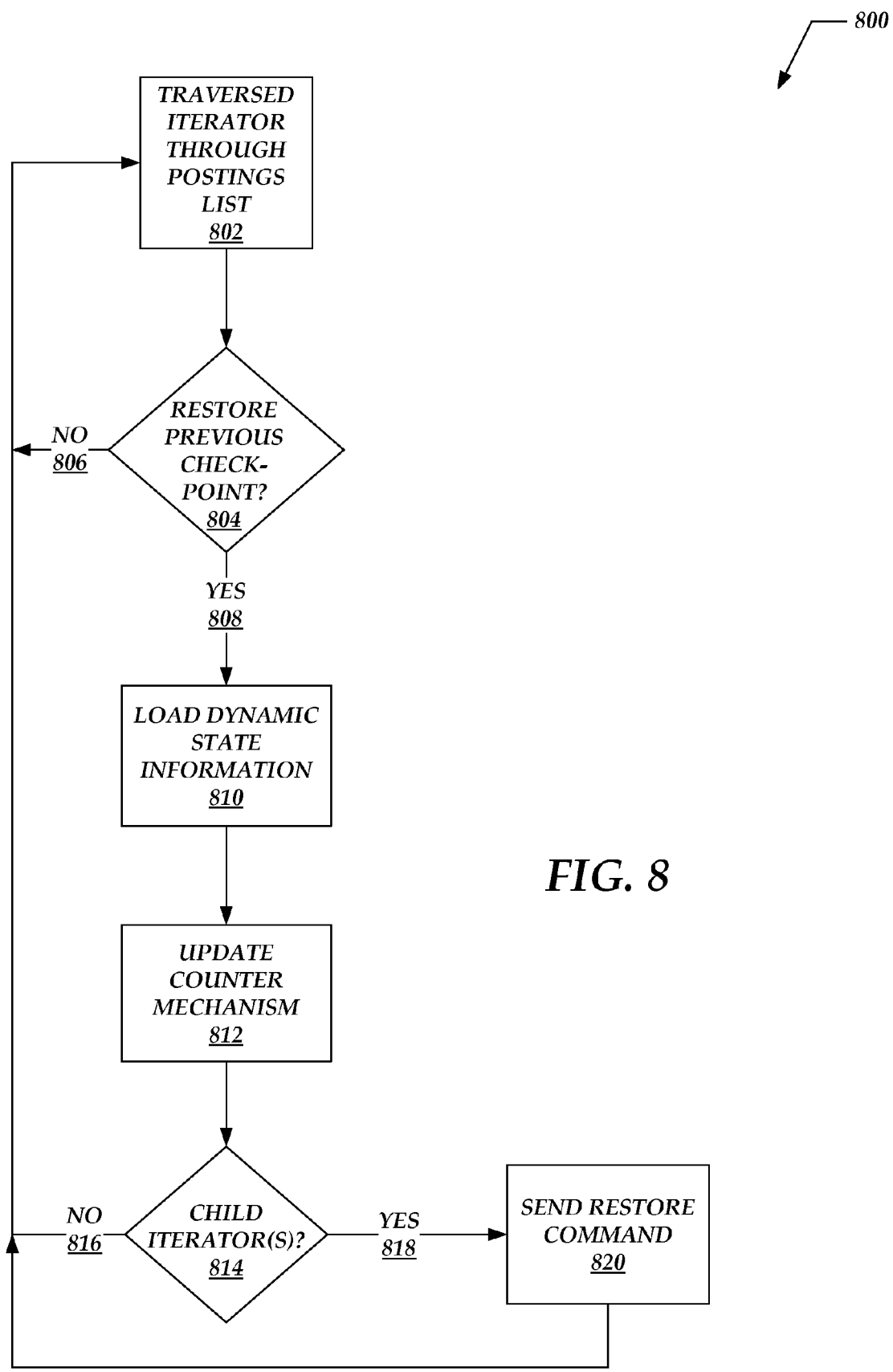
FIG. 8 is a flow diagram illustrating processes for restoring the iterators from previously-saved checkpoints.

Having described the operations of parent and child iterators and FIGS. 5 and 6, the discussion now turns to a description of process flows by which these iterators may operate, whether to save checkpoints (FIG. 7) or to restore from save checkpoints (FIG. 8).

FIG. 7 illustrates process flows, denoted generally at 700, for operating iterators. More specifically, the process flows 700 provide examples of how iterators may create checkpoints that enable the iterators to backtrack or return to a previous state.

Turning to the process flows 700 in more detail, block 702 represents instantiating one or more iterators. As shown in FIG. 7, block 702 may include initializing fixed state information (e.g., 504 and 608 in FIGS. 5 and 6), as represented by block 704. Block 702 may also include initializing dynamic state information (e.g., 506 and 610 in FIGS. 5 and 6), as represented by block 706. Block 702 may also include creating and initializing storage structures for storing save checkpoints during the lifetime of the iterator, as represented by block 708. FIGS. 5 and 6 provide examples of these storage structures at 516 and 614. in addition, in scenarios in which a given iterator operates within a multi-level hierarchy with other child or lower-level iterators, block 702 may include instantiating and initializing any of these child iterators, as represented in block 710.

Block 712 represents operating one or more iterators, having instantiated and initialized them in block 702. More specifically, block 712 may include traversing one or more of the iterators through postings lists. FIG. 3 provides examples of posting lists at 312 and 316.

Block 714 represents updating dynamic state information maintained by one or more of the iterators, as the iterator traverses through postings lists, or performs other operations. For example, referring recently to the storage structures 508 and 606 and FIGS. 5 and 6, the iterators may update the dynamic state information 506 and 610 over time as the iterators execute.

Decision block 716 represents evaluating whether to create and save a checkpoint at one or more arbitrary points in the execution of the iterators. In some scenarios, block 716 may include a given iterator determining on its own to create and save a checkpoint. In other scenarios, block 716 may include the iterator receiving a command from another iterator (e.g., a parent or higher-level iterator) to create and save a checkpoint.

From decision block 716, if no checkpoint is to be created at a given time, the process flows 700 may take No branch 718 to continue the execution of the iterator, represented generally by block 712. Returning to decision block 716, if a checkpoint is to be created and saved at a given time, the process flows 700 may take Yes branch 720 to block 722. Block 722 represents storing the current state of the dynamic state information, as maintained by one or more given iterators. FIGS. 5 and 6 provide examples of capturing and saving checkpoints at 514 and 618, with dynamic state information 506 and 610 being saved into the storage structures 516 and 614.

In some scenarios, block 722 may include copying the dynamic state of a given iterator to storage, with a restore operation recovering this dynamic state by copying it from the storage. In other scenarios, block 722 may include storing data other than the dynamic state information. In these latter scenarios, the restore operation may calculate (rather than directly copying) the original or previous dynamic state of the iterator, based on this data as stored during the checkpointing operation.

In still other scenarios, the checkpointing operation may not store any data or information when checkpointing a given iterator. In these scenarios, the restore operation may recover the original dynamic state of this given iterator by calling one or more lower-level iterators, and obtaining their state information. In turn, the restore operation may calculate the original or previous dynamic state of the given iterator based on the present state of the lower-level iterator(s). In these scenarios, the process flow 700 may bypass block 722.

In some cases, the iterators may include counter mechanisms (e.g., 520 and 620). As described above in FIGS. 5 and 6, these counter mechanisms provide an index that indicates how many checkpoints are currently stored by the iterator at a given time. For example, after creating a new checkpoint, block 724 may increase the counter mechanism in response to storing the new checkpoint.

Decision block 726 represents evaluating whether a given iterator is operating in connection with one or more lower-level or child iterators. If not, the process flows 700 may take No branch 728 to continue executing the iterator, for example, by returning to block 712.

Returning to decision block 726, if the given iterator is operating with one or more child iterators, the process flows 700 may take Yes branch 730 to block 732. Block 732 represents sending a checkpoint command (e.g., 522 or 622 in FIGS. 5 and 6, respectively) to one or more such child iterators. Afterwards, the process flows 700 may return to block 712, as indicated in FIG. 7.

Having described the process flows 700 with a given iterator, it is noted that any number of iterators may concurrently execute respective instances of the process flows. In addition, having described the process flows 700 related to creating and storing checkpoints, the discussion now turns to a description of process flows for restoring the iterators to such stored checkpoints. This description is now provided with FIG. 8.

FIG. 8 illustrates process flows, denoted generally at 800, related to restoring the state of iterators from previously-saved checkpoints. For convenience of description, the process flows 800 are described under the assumption that one or more given iterators have been created and initialized, for example, according to the process flows 700.

Turning to the process flows 800 in more detail, block 802 represents executing one or more given iterators, for example, by traversing the iterators through one or more posting lists. At any point in the execution of a given iterator, block 804 represents evaluating whether to restore the iterator to a previously-saved checkpoint. For example, a given high-level iterator may determine on its own to restore to a previous state, and may also direct any child iterators to restore themselves to a previous state. As another example, a lower-level or child iterator may receive an external command from a parent or higher-level iterator, directing it to restore to a previous state.

As above with decision block 716 in FIG. 7, decision block 804 in FIG. 8 may be implemented as a constantly-running background process, in some scenarios. However, decision block 804 may also be implemented as a discrete point through which the process flows 800 pass periodically.

From decision block 804, if the iterator is not to restore to a previous checkpoint, the process flows 800 may take No branch 806 to return to block 802. However, from decision block 804, if the iterator is to restore a previously-saved checkpoint, the process flows 800 may take Yes branch 808 to block 810.

Block 810 represents loading dynamic state information (e.g., 506 or 610), as stored in the checkpoint storage entries (e.g., 518 or 616) occupied by the checkpoint to which the iterator is restoring. By loading the stored dynamic state information from the checkpoint storage entries, the iterators may effectively backtrack or restore to the previous state represented by the checkpoint. In addition, the iterators may restore to a previous point in time, by accessing successive checkpoints.

In some scenarios, block 810 may include copying the dynamic state of a given iterator directly from storage, in cases where the checkpointing operation stored this dynamic state information. In other scenarios, the checkpointing operation may store data other than the dynamic state information. In these latter scenarios, block 810 may include calculating (rather than directly copying) the original or previous dynamic state of the iterator, based on this data as stored during the checkpointing operation.

In still other scenarios, the checkpointing operation may not store any data or information when checkpointing a given iterator. In these scenarios, the block 810 may include recovering the original dynamic state of this given iterator by calling one or more lower-level iterators, and obtaining their state information. In turn, the restore operation as performed by block 810 may calculate the original or previous dynamic state of the given iterator based on the present state of the lower-level iterator(s).

In some scenarios, block 810 may load the dynamic state information from the same entry, in cases where storage structures (e.g., 516 and 614) include only one storage entry. In other scenarios, featuring stack implementations or the like, block 810 may load the dynamic state information from the top of the stack. In these latter scenarios, block 812 may include updating a storage counter or other counter mechanism to reflect that a checkpoint has been popped from the top of the stack. For example, block 812 may include decrementing the counter mechanism after popping the checkpoint from the top of the stack.

Decision block 814 represents evaluating whether a given iterator is operating in a multi-level hierarchy with one or more child iterators. If not, the process flows 800 may take No branch 816 to return to block 802, for example. However, if the given iterator is operating with one or more child iterators, the process flows 800 may take Yes branch 818 to block 820, which represents sending a restore command to any such child iterators. Afterwards, the process flows 800 may return to block 802, as indicated in FIG. 8.

CONCLUSION

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

In addition, certain process and data flows are represented herein as unidirectional only for the purposes of facilitating this description. However, these unidirectional representations do not exclude or disclaim implementations that incorporate bidirectional flows.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-readable storage medium having computer-executable instructions stored thereon which, when executed by a computer system, cause the computer system to perform a method comprising:
    instantiating at least one iterator in response to a search request, wherein the iterator includes fixed state information that remains constant over a life of the iterator, and includes dynamic state information that is updated over the life of the iterator;
    creating a storage structure associated with the iterator and storing a representation of the dynamic state information in the storage structure;
    creating a stack structure that includes a plurality of entries, further storing the representation of the dynamic state information in one of the entries, and further storing at least a further representation of a further instance of the dynamic state information in a further one of the entries;
    traversing the iterator through at least a portion of at least one postings list in connection with performing a search in response to the search request;
    updating at least one instance of the dynamic state information, as the iterator traverses through at least the portion of the postings list while performing the search; and
    evaluating whether to create a checkpoint of the iterator at one or more points during the iterator traversing through at least the portion of the postings list while performing the search, wherein the checkpoint includes at least a representation of the dynamic state information at one of the points.

2. The storage medium of claim 1, further comprising instructions for storing the representation of only the dynamic state information, as associated with the checkpoint.

3. The storage medium of claim 1, further comprising instructions for storing data from which the dynamic state information is calculated when restoring the checkpoint of the iterator.

4. The storage medium of claim 1, further comprising instructions for evaluating whether the iterator is associated with at least one child iterator.

5. The storage medium of claim 1, further comprising instructions for sending a command to at least one child iterator, associated with the iterator, to create a further checkpoint associated with the child iterator, wherein the further checkpoint includes at least a further representation of further dynamic state information maintained by the child iterator.

6. The storage medium of claim 1, wherein the instructions for evaluating whether to create a checkpoint include instructions for directing the iterator to create a checkpoint, in response to a checkpoint command received from a parent iterator.

7. The storage medium of claim 1, wherein the instructions for evaluating whether to create a checkpoint include instructions for directing the iterator to create a checkpoint.

8. A computer-readable storage medium having computer-executable instructions stored thereon which, when executed by a computer system, cause the computer system to perform a method comprising:
    traversing an iterator through at least a portion of at least one postings list in response to at least one search request, wherein the iterator includes fixed state information that remains constant over a life of the iterator, and dynamic state information that is updated over the life of the iterator, wherein the iterator includes a storage structure associated with the iterator for storing a representation of the dynamic state information, wherein a stack structure includes a pima it of entries for storing the representation of the dynamic state information in one of the entries and for storing at least a further representation of a further instance of the dynamic state information in a further one of the entries, wherein the storage structure further includes a representation of at least one checkpoint, and wherein the checkpoint represents at least one instance of the dynamic state information at a particular point during the iterator traversing through at least the portion of the postings list while performing a search;

updating at least one instance of the dynamic state information as the iterator traverses through at least the portion of the postings list while performing the search; and evaluating whether to restore the iterator to a previous state represented by the dynamic state information represented by the checkpoint.

9. The storage medium of claim 8, further comprising instructions for loading the dynamic state information from the storage structure into the iterator, so as to restore the iterator to the previous state.

10. The storage medium of claim 8, further comprising instructions for calculating the dynamic state information based on information stored in the storage structure when checkpointing the iterator.

11. The storage medium of claim 8, further comprising instructions for evaluating whether the iterator is associated with at least one child iterator.

12. The storage medium of claim 11, further comprising instructions for sending a command to the at least one child iterator, directing the child iterator to restore dynamic state information maintained by the child iterator.

13. The storage medium of claim 8, wherein the instructions for evaluating whether to restore the iterator include instructions for directing the iterator to restore dynamic state information from at least one checkpoint, in response to a restore command received from a parent iterator.

14. The storage medium of claim 8, wherein the instructions for evaluating whether to restore the iterator include instructions for directing the iterator to restore dynamic state information from at least one previously-stored checkpoint.

15. A computer-implemented method comprising computer-implemented operations for:

instantiating at least one iterator in response to a search request, wherein the iterator includes fixed state information that remains constant over a life of the iterator, and includes dynamic state information that is updated over the life of the iterator;

creating a storage structure associated with the iterator and storing a representation of the dynamic state information in the storage structure;

creating a stack structure that includes a plurality of entries, further storing the representation of the dynamic state information in one of the entries, and further storing at least a further representation of a further instance of the dynamic state information in a further one of the entries;

traversing the iterator through at least a portion of at least one postings list in connection with performing a search in response to the search request;

updating at least one instance of the dynamic state information, as the iterator traverses through at least the portion of the postings list while performing the search; and evaluating whether to create a checkpoint of the iterator at one or more points during the iterator traversing through at least the portion of the postings list while performing the search, wherein the checkpoint includes at least a representation of the dynamic state information at one of the points.

16. The method of claim 15, further comprising storing the representation of only the dynamic state information, as associated with the checkpoint.

17. The method of claim 15, further comprising storing data from which the dynamic state information is calculated when restoring the checkpoint of the iterator.

18. The method of claim 15, further comprising evaluating whether the iterator is associated with at least one child iterator.

19. The method of claim 15, further comprising sending a command to at least one child iterator, associated with the iterator, to create a further checkpoint associated with the child iterator, wherein the further checkpoint includes at least a further representation of further dynamic state information maintained by the child iterator.

20. The method of claim 15, wherein evaluating whether to create a checkpoint further comprises directing the iterator to create a checkpoint, in response to a checkpoint command received from a parent iterator.

* * * * *